United States Patent
Fujito et al.

(10) Patent No.: US 8,903,401 B2
(45) Date of Patent: *Dec. 2, 2014

(54) RADIO BASE STATION AND CONNECTION ESTABLISHMENT CONTROL METHOD

(75) Inventors: Kyoko Fujito, Kanagawa (JP); Keiji Murakami, Kanagawa (JP); Hirokazu Matsunami, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/518,791

(22) PCT Filed: Dec. 24, 2010

(86) PCT No.: PCT/JP2010/073355
§ 371 (c)(1),
(2), (4) Date: Jun. 22, 2012

(87) PCT Pub. No.: WO2011/078328
PCT Pub. Date: Jun. 30, 2011

(65) Prior Publication Data
US 2012/0258719 A1    Oct. 11, 2012

(30) Foreign Application Priority Data
Dec. 24, 2009  (JP) ................................ 2009-293511

(51) Int. Cl.
| | |
|---|---|
| H04W 4/00 | (2009.01) |
| H04W 88/08 | (2009.01) |
| H04W 36/00 | (2009.01) |
| H04W 92/20 | (2009.01) |
| H04W 28/04 | (2009.01) |
| H04W 76/02 | (2009.01) |

(52) U.S. Cl.
CPC .............. *H04W 88/08* (2013.01); *H04W 36/00* (2013.01); *H04W 92/20* (2013.01); *H04W 28/04* (2013.01); *H04W 76/02* (2013.01)
USPC ........................................................ 455/438

(58) Field of Classification Search
CPC ............................. H04W 76/04; H04W 36/00
USPC ........... 455/436–444, 114.2, 522, 525, 432.1; 370/332, 331
See application file for complete search history.

(56) References Cited

U.S. PATENT DOCUMENTS 8,169,971 B2 *  5/2012  Kagimoto et al. ............ 370/331
8,391,869 B2    3/2013  Watanabe et al.
(Continued)

FOREIGN PATENT DOCUMENTS

| JP | 2004-289226 A | 10/2002 |
|---|---|---|
| JP | 2008-154119 A | 7/2008 |

(Continued)

OTHER PUBLICATIONS

3GPP TS 36.300 V8.5.0(May 2008); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

(Continued)

*Primary Examiner* — Kiet Doan
(74) *Attorney, Agent, or Firm* — Studebaker & Brackett PC

(57) ABSTRACT

An LTE base station (10-1) acquires handover history information indicating the handover history of a radio terminal (40). On the basis of the acquired handover history information, the LTE base station (10-1) determines another LTE base station with which an X2 connection is to be established.

5 Claims, 8 Drawing Sheets

(56) References Cited

U.S. PATENT DOCUMENTS

| | | |
|---|---|---|
| 2004/0185851 A1 | 9/2004 | Nagai |
| 2005/0128969 A1* | 6/2005 | Lee et al. .................. 370/313 |
| 2005/0221828 A1* | 10/2005 | Wakuta et al. ............. 455/437 |
| 2008/0076423 A1* | 3/2008 | Lee et al. .................. 455/436 |
| 2008/0153495 A1 | 6/2008 | Ogami et al. |
| 2009/0042597 A1 | 2/2009 | Yuuki |
| 2009/0088152 A1* | 4/2009 | Orlassino ................. 455/432.1 |
| 2009/0262701 A1* | 10/2009 | Motegi et al. ............. 370/331 |
| 2010/0202410 A1 | 8/2010 | Watanabe et al. |
| 2012/0040678 A1 | 2/2012 | Matsunami et al. |

FOREIGN PATENT DOCUMENTS

| | | |
|---|---|---|
| JP | 2009-044336 A | 2/2009 |
| JP | 2009-253357 A | 10/2009 |
| WO | 2009/066337 A1 | 5/2009 |
| WO | 2010/123121 A1 | 10/2010 |

OTHER PUBLICATIONS

International Search Report; PCT/JP2010/073355; Feb. 8, 2011.
An Office Action; "Notice of Reason for Rejection," issued by the Japanese Patent Office on Nov. 19, 2013, which corresponds to Japanese Patent Application No. 2009-293511 and is related to U.S. Appl. No. 13/518,791; with English language statement of relevance.

* cited by examiner

FIG. 4

| GLOBAL-CID#2 | 00:12:34 |
|---|---|
| GLOBAL-CID#3 | 00:03:03 |
| ⋮ | ⋮ |

FIG. 5

| GLOBAL-CID#2 | ESTABLISHED |
|---|---|
| GLOBAL-CID#3 | UNESTABLISHED |
| ⋮ | ⋮ |

FIG. 6

| PHY-CID |
|---|
| RADIO FIELD STRENGTH |

FIG. 7

| GLOBAL-CID |
|---|

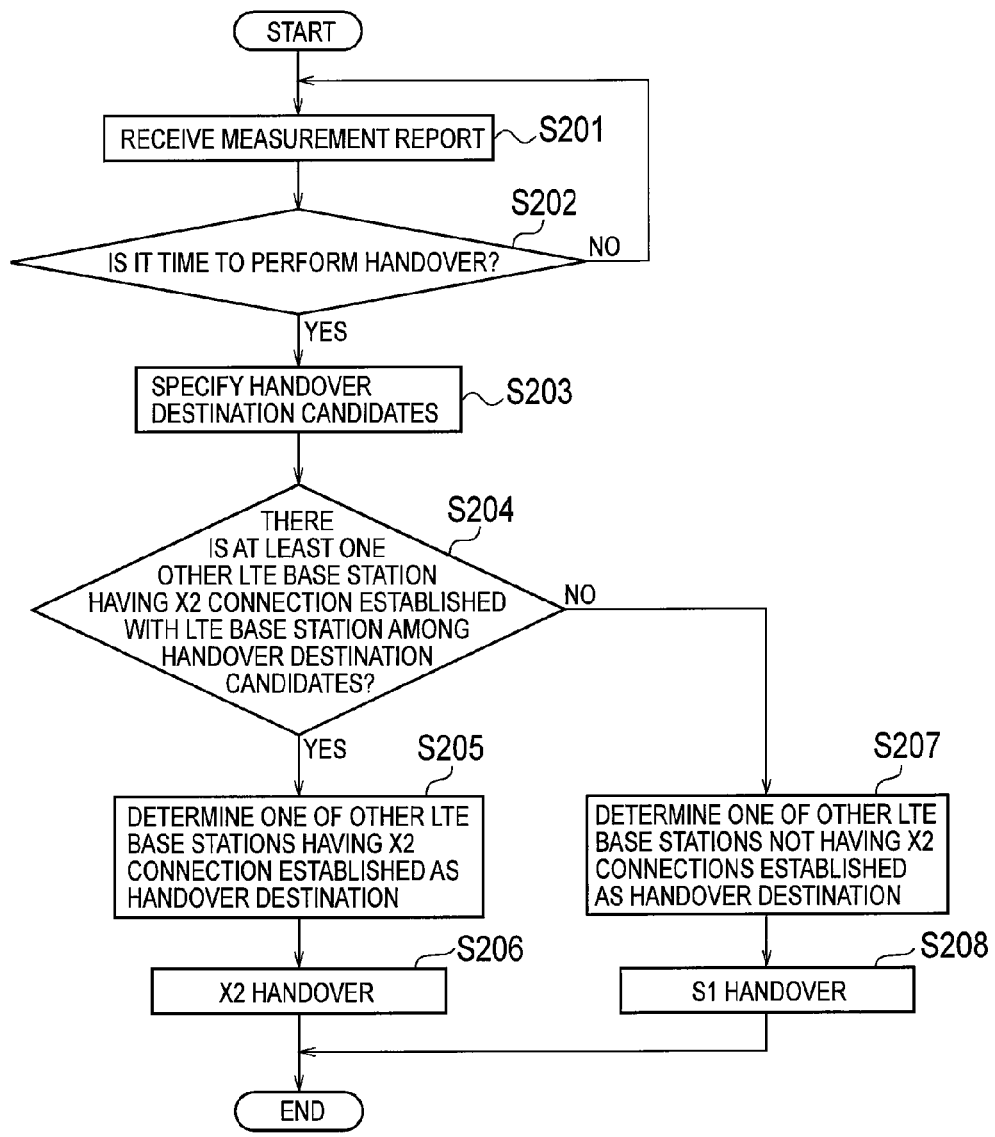

RADIO BASE STATION AND CONNECTION ESTABLISHMENT CONTROL METHOD

TECHNICAL FIELD

The present invention relates to a radio base station which establishes a connection that is a logical transmission path with another radio base station, and to a connection establishment control method in the radio base station.

BACKGROUND ART

A radio communication system such as LTE (Long Term Evolution), which is currently undergoing standardization in 3GPP (Third Generation Partnership Project), requires not only an S1 connection that is a logical transmission path between a radio base station (hereinafter referred to as a "LTE base station") and a core network, but also an X2 connection that is a logical transmission path between radio base stations in order to achieve a quick handover, reduction in a processing load on the core network, and so forth.

In order to establish X2 connections, an LTE base station acquires information on other neighboring LTE base stations and retains a neighboring base station list (hereinafter referred to as a "neighbor list") as a list of the information on the other LTE base stations. The other neighboring LTE base stations are other LTE base stations located at short distances from the LTE base station. Only after retaining the neighbor list, the LTE base station can control establishment of the X2 connections, load balancing with the LTE base stations, restrictions during a maintenance work, and the like.

An ANR (Automatic Neighbor Relation Function) is one of conceivable methods for the LTE base station to acquire the neighbor list. The ANR is the method in which the LTE base station receives a measurement report transmitted from a radio terminal either periodically or on an event basis and acquires a neighbor list based on the measurement report (see Non-patent Document 1, for example).

Moreover, the LTE base station can request the radio terminal to perform a handover based on the measurement report from the radio terminal. The measurement report contains an ID of an LTE base station which is a sender of a signal (a BCH signal) received by the radio terminal through a broadcast channel (BCH), information on radio field strength of the signal, and the like. Based on the ID of the LTE base information and the information on the radio field strength contained in the measurement report, the LTE base station can identify an LTE base station for a handover destination and instruct the radio terminal to perform a handover at an appropriate timing.

In addition, the LTE radio communication system has a data forwarding function for performing handovers with few packet losses. The data forwarding function is a function with which just before a handover, an LTE base station forwards data, which is yet to be transmitted from the LTE base station to a radio terminal, to another LTE base station of a handover destination via an X2 connection. The LTE base station of the handover destination transmits the data, which is received via the X2 connection, through a radio channel to the radio terminal that is newly connected as a consequence of the handover. Thus it is possible to prevent packet losses in the handover.

For the LTE radio communication system, there are prescribed above-described handover involving data forwarding via an X2 connection (hereinafter referred to as an "X2 handover") and a handover involving data forwarding via an S1 connection (hereinafter referred to as an "S1 handover").

PRIOR ART DOCUMENT

Non-Patent Document

Non-Patent Document 1: "3GPP TS 36.300 V8.5.0 (2008-05)", [online], [searched on Dec. 15, 2009], <URL: http://www.arib.or.jp/IMT-2000/V700Sep08/5_Appendix/Re18/36/36300-850.pdf>

SUMMARY OF THE INVENTION

However, if an X2 connection is established upon start-up of an LTE base station according to the setting made in advance by maintenance staff or by an OAM, the X2 connection is fixedly established, without consideration of past records of handovers, while the LTE base station is in operation. For this reason, X2 connections unused for handovers, i.e., wasteful X2 connections may be established.

On the other hand, in order for an LTE base station to update an X2 connection as needed during its operation, there is another conceivable method in which the LTE base station establishes an X2 connection with another LTE base station identified by an ID contained in a measurement report. However, the method based on the measurement report merely allows the LTE base station to establish the X2 connection only with another LTE base station likely to serve as a handover destination, without consideration of past records of handovers. Therefore, wasteful X2 connections may be also established even with the method based on the measurement report.

In view of the aforementioned problems, it is an objective of the present invention to provide a radio base station and a connection establishment control method, which are capable of establishing an appropriate connection with another radio base station.

The present invention has the following features to solve the problems described above. A first feature of the present invention is summarized as follows. A radio base station (LTE base station 10-1) configured to establish a connection (X2 connection) being a logical transmission path with any of other radio base stations, comprises: a history acquisition unit (handover history acquisition unit 152) configured to acquire handover history information indicating handover history of a radio terminal; and an establishment counterpart determination unit (connection establishment counterpart determination unit 154) configured to determine one of the other radio base stations as a counterpart in establishing the connection based on the handover history information acquired by the history acquisition unit.

When another radio base station having served as a handover destination for a radio terminal in the past is compared with another radio base station not having served as a handover destination for a radio terminal in the past, it is more likely that the radio terminal connected to the other radio base station having served as the handover destination for the radio terminal in the past will perform a handover from the other radio base station to the radio base station. Accordingly, the radio base station can establish a connection in consideration of the past record of the handover by determining another radio base station as a counterpart in establishing the connection on the basis of the handover history of the radio terminal. Thus, the radio base station can establish an appropriate connection while restricting establishment of wasteful connections with other radio base stations that are less likely to serve as handover destinations.

A second feature of the present invention is summarized as follows. The handover history information comprises connection time of the radio terminal with the other radio base stations of past handover destinations, and the establishment counterpart determination unit determines the other radio base station corresponding to the connection time equal to or above a predetermined threshold as the counterpart in establishing the connection.

A third feature of the present invention is summarized as follows. The establishment counterpart determination unit determines the counterpart in establishing the connection from a predetermined number of most recent other base stations having served as handover destinations among the radio base stations of the past handover destinations for the radio terminal.

A fourth feature of the present invention is summarized as follows. The establishment counterpart determination unit acquires communication quality between the radio terminal and the other radio base stations and determines one of the other radio base stations as the counterpart in establishing the connection based on the communication quality.

A fifth feature of the present invention is summarized as follows. The radio base station comprises a handover destination determination unit (handover destination determination unit 158) configured to determine the other radio base station having the connection established with the radio base station, as a handover destination for the radio terminal in preference to the other radio base stations not having the connection established with the radio base station.

A sixth feature of the present invention is summarized as follows. A connection establishment control method for a radio base station configured to establish a connection being a logical transmission path with any of other radio base stations, comprises: causing the radio base station to acquire handover history information indicating handover history of a radio terminal; and causing the radio base station to determine one of the other radio base stations as a counterpart in establishing the connection based on the acquired handover history information.

According to the present invention, it is possible to establish an appropriate connection with another radio base station.

BRIEF DESCRIPTION OF THE DRAWINGS

FIG. 4 is a view showing an example of handover history information from a radio terminal according to the embodiment of the present invention.

FIG. 5 is a view showing an example of a neighbor list according to the embodiment of the present invention.

FIG. 6 is a view showing an example of a first measurement report from the radio terminal according to the embodiment of the present invention.

FIG. 7 is a view showing an example of a second measurement report from the radio terminal according to the embodiment of the present invention.

FIG. 11 is a second flowchart showing a third operation of the LTE base station according to the embodiment of the present invention.

DESCRIPTION OF THE EMBODIMENT

Figure 1:
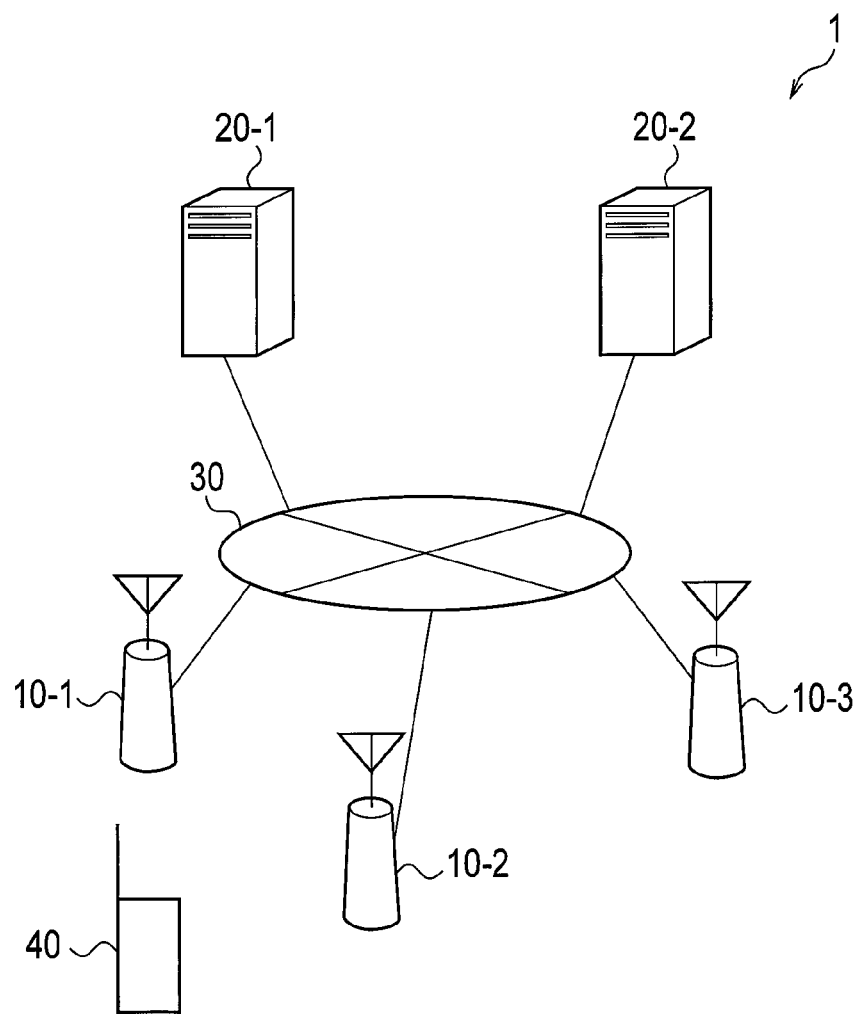
FIG. 1 is an overall schematic configuration diagram of a radio communication system according to an embodiment of the present invention.

Next, embodiments of the present invention will be described with reference to the drawings. Specifically, descriptions will be given of (1) Schematic Configuration of Radio Communication System, (2) Configuration of LTE Base Station, (3) Operations of LTE Base Station, (4) Operation and Effects, and (5) Other Embodiments. Note that throughout the description of the drawings of the following embodiment, identical or similar portions are designated by identical or similar reference numerals.

(1) Schematic Configuration of Radio Communication System

FIG. 1 is a schematic configuration diagram of a radio communication system of this embodiment. In this embodiment, a radio communication system 1 is constructed by use of LTE techniques. The radio communication system 1 shown in FIG. 1 includes radio base stations (LTE base stations) 10-1, 10-2, and 10-3, MME (Mobile Management Entity)/SGW (Serving Gateway) units 20-1 and 20-2 which are forwarding control devices installed in a core network serving as an upper network, a backbone network 30, and a radio terminal 40.

In an initial state, only an 51 connection which is a logical transmission path on a transport layer is established between any of the LTE base stations 10-1 to 10-3 and any of the MME/SGW units 20-1 and 20-2 via the backbone network 30.

Figure 2:
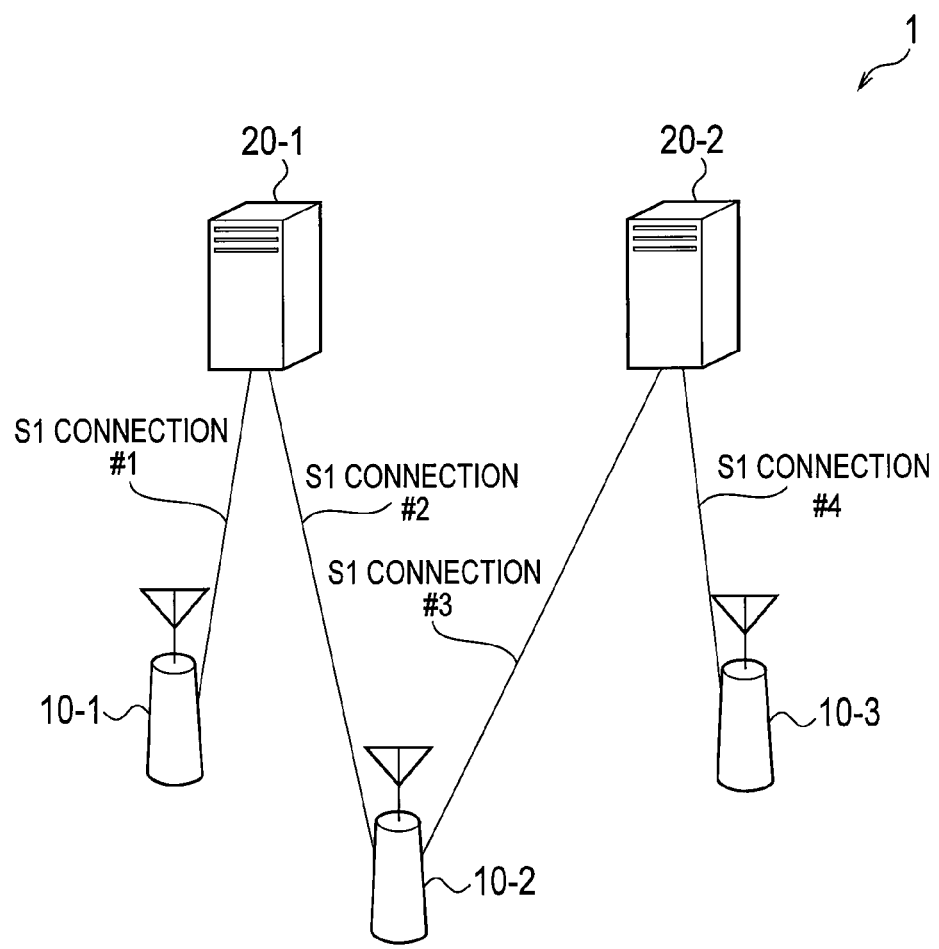
FIG. 2 is a view showing an established state of S1 connections in the radio communication system according to the embodiment of the present invention.

FIG. 2 is a view showing an established state of the S1 connections in the initial state in the radio communication system 1. In FIG. 2, an S1 connection #1 is established between the LTE base station 10-1 and the MME/SGW unit 20-1. Meanwhile, an S1 connection #2 is established between the LTE base station 10-2 and the MME/SGW unit 20-1 while an S1 connection #3 is established between the LTE base station 10-2 and the MME/SGW unit 20-2. Moreover, an S1 connection #4 is established between the LTE base station 10-3 and the MME/SGW unit 20-2. Here, another S1 connection may further be established between the LTE base station 10-1 and the MME/SGW unit 20-2 and still another S1 connection may further be established between the LTE base station 10-3 and the MME/SGW unit 20-1.

The LTE base stations 10-1 to 10-3 perform radio communication with the radio terminal 40 through a radio communication interval. In the LTE, a communication mode between the LTE base stations 10-1 to 10-3 and the radio terminal 40 is referred to as E-UTRAN (Evolved UMTS Terrestrial Radio Access Network).

(2) Configuration of LTE Base Station

Figure 3:
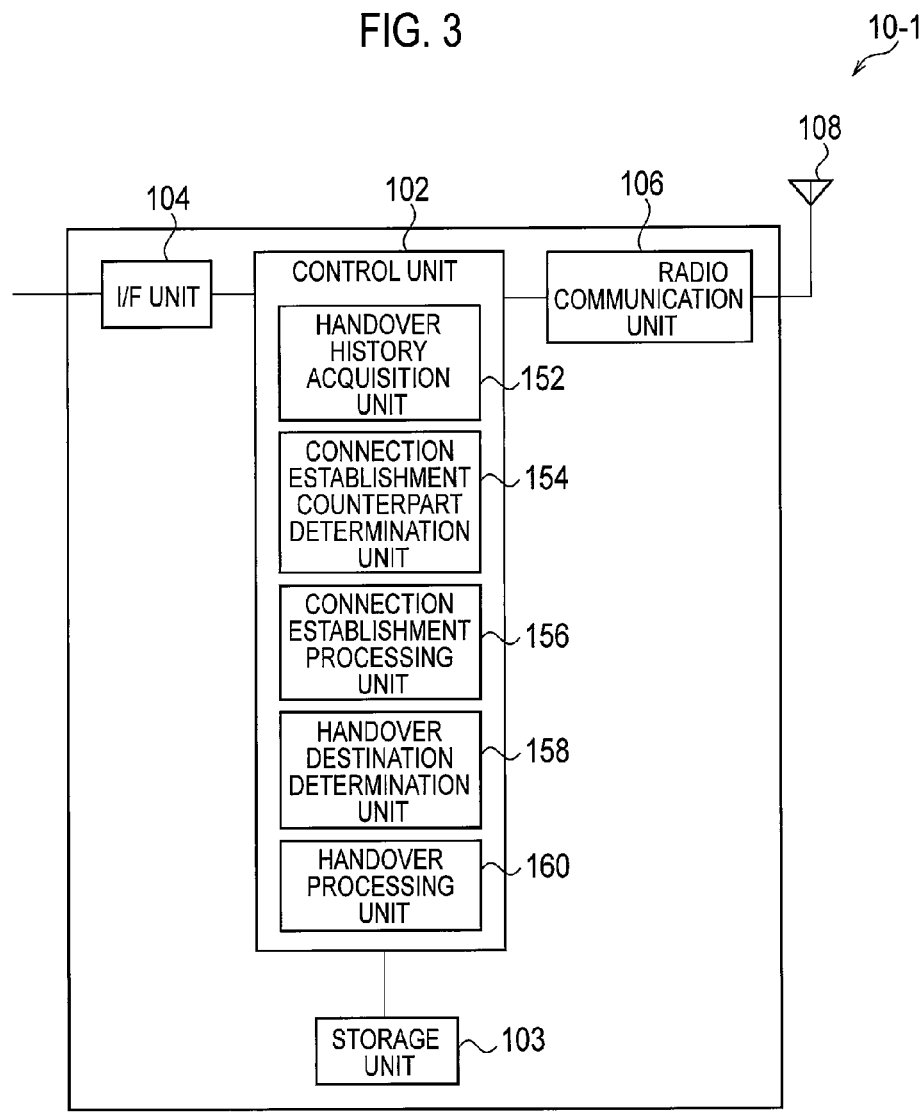
FIG. 3 is a configuration diagram of an LTE base station according to the embodiment of the present invention.

FIG. 3 is a view showing a configuration of the LTE base station. The LTE base station 10-1 shown in FIG. 2 includes a control unit 102, a storage unit 103, an I/F unit 104, a radio communication unit 106, and an antenna 108. Note that the LTE base stations 10-2 and 10-3 also have a configuration similar to the LTE base station 10-1.

The control unit 102 is formed of a CPU, for example, and is configured to control various functions included in the LTE base station 10-1. The storage unit 103 is formed of a memory, for example, and is configured to store a variety of information used, for instance, for the control by the LTE base station 10-1.

The I/F unit 104 is connected to the backbone network 30. The radio communication unit 106 includes a RF circuit, a baseband circuit, and the like and is configured to perform modulation and demodulation as well as coding and decoding, and to perform transmission and reception of radio signals to and from the radio terminal 40 via the antenna 108.

The control unit 102 includes a handover history acquisition unit 152, a connection establishment counterpart determination unit 154, a connection establishment processing unit 156, a handover destination determination unit 158, and a handover processing unit 160.

Upon a handover of the radio terminal 40 connected to another LTE base station (the LTE base station 10-2 or the LTE base station 10-3 other than the LTE base station 10-1 in this case), such another LTE base station transmits a handover request to still another LTE base station (the LTE base station 10-1 in this case) qualifying for a handover destination.

This handover request includes a global ID (Global-CID) which is identification information on the other LTE base station having served as a new connection destination due to a handover and also includes connection time to the LTE base station having served as the connection destination for each handover of the radio terminal 40 in the past. The connection time is measured by the radio terminal 40 for each handover of the radio terminal 40. FIG. 4 is a view showing an example of handover history information. In FIG. 4, pieces of handover history information are arranged in reverse chronological order of time points when relevant handovers took place.

The handover history acquisition unit 152 receives the handover request from the other LTE base station via the I/F unit 104.

Next, the handover history acquisition unit 152 reads a neighbor list which is stored in the storage unit 103. FIG. 5 is a view showing an example of the neighbor list. The neighbor list shown in FIG. 5 contains the Global-CID of other LTE base stations having served as the handover destinations in the handovers in the past where the LTE base station 10-1 served as the handover source, and X2 connection establishment information indicating whether or not an X2 connection is established between the LTE base station 10-1 and each of the other LTE base stations of the past handover destinations.

Next, the handover history acquisition unit 152 updates the neighbor list thus read out. Specifically, the handover history acquisition unit 152 specifies a Global-CID not included in the neighbor list in the Global-CIDs in the handover history information. Further, the handover history acquisition unit 152 adds the specified Global-CID to the neighbor list and defines the X2 connection establishment information corresponding to the Global-CID as "unestablished".

Next, the handover processing unit 160 judges whether or not it is possible to perform a handover (an X2 handover) so as to execute data forwarding between the LTE base station 10-1 and the other LTE base station, which is the sender of the handover request, via the X2 connection being the logical transmission path on the transport layer.

Specifically, the handover processing unit 160 judges whether or not the X2 connection establishment information corresponding to the Global-CID of the other LTE base station being the sender of the handover request among the Global-CID in the neighbor list is defined as "established". When the X2 connection establishment information is defined as "established", the handover processing unit 160 judges that the X2 handover is possible between the LTE base station 10-1 and the other LTE base station being the sender of the handover request.

When the X2 handover is possible between the LTE base station 10-1 and the other LTE base station being the sender of the handover request, the handover processing unit 160 performs the X2 handover for the radio terminal 40 by setting the other LTE base station being the sender of the handover request as the handover source while setting the LTE base station 10-1 itself as the handover destination.

On the other hand, when the X2 handover is not possible between the LTE base station 10-1 and the other LTE base station being the sender of the handover request, the handover processing unit 160 performs a handover (an S1 handover) via the S1 connection for the radio terminal 40 by setting the other LTE base station being the sender of the handover request as the handover source while setting the LTE base station 10-1 itself as the handover destination.

The radio terminal 40 connected to the LTE base station 10-1 byway of the handover receives a broadcast control channel (BCH) signal from a neighboring LTE base station. This BCH signals contains a physical ID (Phy-CID) and the global ID (Global-CID) serving as identification information on the sender LTE base station. Next, the radio terminal 40 measures radio field strength of the BCH signal. Then, the radio terminal 40 generates a measurement report that contains the Phy-CID and the radio field strength, and transmits the measurement report to the LTE base station 10-1. FIG. 6 is a view showing a first measurement report from the radio terminal 40.

The connection establishment counterpart determination unit 154 receives the first measurement report from the radio terminal 40 via the antenna 108 and the radio communication unit 106.

Next, the connection establishment counterpart determination unit 154 transmits to the radio terminal 40 via the radio communication unit 106 and the antenna 108 a request for the Global-CID that corresponds to the Phy-CID of the other LTE base station contained in the first measurement report. Such a Global-CID request contains the Phy-CID of the other LTE base station.

Upon receipt of the Global-CID request, the radio terminal 40 identifies the Global-CID of the other LTE base station on the basis of the Phy-CID of the other LTE base station contained in the Global-CID request. Moreover, the radio terminal 40 transmits the Global-CID of the other LTE base station to the LTE base station 10-1. FIG. 7 is a view showing the Global-CID which represents a second measurement report from the radio terminal 40.

The connection establishment counterpart determination unit 154 receives the Global-CID of the other LTE base station from the radio terminal 40 via the antenna 108 and the radio communication unit 106. Next, the connection establishment counterpart determination unit 154 associates the received second measurement report representing the Global-CID of the other LTE base station with the first measurement report corresponding to the same LTE base station. Further, the connection establishment counterpart determination unit 154 stores a measurement report formed of the first measurement report and the second measurement report in the storage unit 103.

Next, the connection establishment counterpart determination unit 154 selects pieces of the handover history information stored in the storage unit 103 one by one in reverse chronological order of time points of relevant handovers.

Further, the connection establishment counterpart determination unit 154 judges whether or not the connection time included in each selected piece of the handover history information, i.e., the connection time of the radio terminal 40 to the other LTE base station corresponding to the selected piece of the handover history information is equal to or above a threshold. Such a threshold is stored in the storage unit 103, for example.

When the connection time of the radio terminal 40 to the other LTE base station corresponding to the selected piece of the handover history information is equal to or above the threshold, the connection establishment counterpart determination unit 154 judges whether or not the radio field strength of the BCH signal from the LTE base station corresponding to the selected piece of the handover history information is equal to or above a predetermined value at the radio terminal 40.

Specifically, the connection establishment counterpart determination unit 154 specifies the Global-CID in the selected piece of the handover history information. Then, the connection establishment counterpart determination unit 154 specifies the measurement report that contains the specified Global-CID out of the measurement reports stored in the storage unit 103. Next, the connection establishment counterpart determination unit 154 specifies the radio field strength in the specified measurement report and judges whether or not the radio field strength is equal to or above the predetermined value. The predetermined value is stored in the storage unit 103, for example.

When the specified radio field strength is equal to or above the predetermined threshold, the connection establishment counterpart determination unit 154 specifies the Global-CID associated with the specified radio field strength and determines the other LTE base station corresponding to the Global-CID as a counterpart in establishing the X2 connection, in the measurement report. When the counterpart in establishing the X2 connection is determined, the connection establishment counterpart determination unit 154 terminates the series of processes without further selecting the pieces of the handover history information.

On the other hand, when the specified radio field strength is below the predetermined value, the connection establishment counterpart determination unit 154 selects the next piece of the handover history information in accordance with the aforementioned selection order of selecting the pieces of the handover history information in reverse chronological order of the time points of the relevant handovers. Thereafter, the connection establishment counterpart determination unit 154 repeats the above-described processes, namely, the judgment as to whether or not the connection time of the radio terminal 40 to the other LTE base station corresponding to the selected piece of the handover history information is equal to or above the threshold, the judgment as to whether or not the radio field strength of the BCH signal from the other LTE base station corresponding to the selected piece of the handover history information is equal to or above the predetermined value, and the process to determine the counterpart in establishing the X2 connection. Then, upon determination of the counterpart in establishing the X2 connection, the connection establishment counterpart determination unit 154 terminates the series of the processes without further selecting the pieces of the handover history information.

In the meantime, the connection establishment counterpart determination unit 154 does not further select the pieces of the handover history information when the number of selected pieces of the handover history information reaches a predetermined upper limit. In this case, when the connection time of the radio terminal 40 to the other LTE base station corresponding to the most recently selected piece of the handover history information is equal to or above the threshold and when the radio field strength of the BCH signal from the LTE base station corresponding to the most recently selected piece of the handover history information is equal to or above the predetermined value, the connection establishment counterpart determination unit 154 determines the other LTE base station corresponding to the most recently selected piece of the handover history information as the counterpart in establishing the X2 connection. On the other hand, when the connection time of the radio terminal 40 to the other LTE base station corresponding to the most recently selected piece of the handover history information is below the threshold or when the radio field strength of the BCH signal from the other LTE base station corresponding to the most recently selected piece of the handover history information is below the predetermined value, the connection establishment counterpart determination unit 154 either determines the other LTE base station corresponding to the initially selected piece of the handover history information as the counterpart in establishing the X2 connection, or terminates the series of processes without determining the counterpart in establishing the X2 connection.

After the other LTE base station qualifying for the counterpart in establishing the X2 connection is determined by the connection establishment counterpart determination unit 154, the connection establishment processing unit 156 generates a SCTP (Stream Control Transmission Protocol) connection request which is a request for establishing an X2 connection. Moreover, the connection establishment processing unit 156 transmits the SCTP connection request to the other LTE base station, which is the counterpart in establishing the X2 connection, via the I/F unit 104 and the backbone network 30. Thereafter, the X2 connection is established between the LTE base station 10-1 and the other LTE base station that receives the SCTP connection request. Here, the connection establishment processing unit 156 does not execute the X2 connection establishment process when the X2 connection establishment information in the neighbor list corresponding to the other LTE base station being the counterpart in establishing the X2 connection is defined as "established".

After the X2 connection is established, the connection establishment processing unit 156 updates the X2 connection establishment information in the neighbor list corresponding to the Global-CID of the other LTE base station being the destination of transmission of the SCTP connection request by changing unestablished into established.

Figure 8:
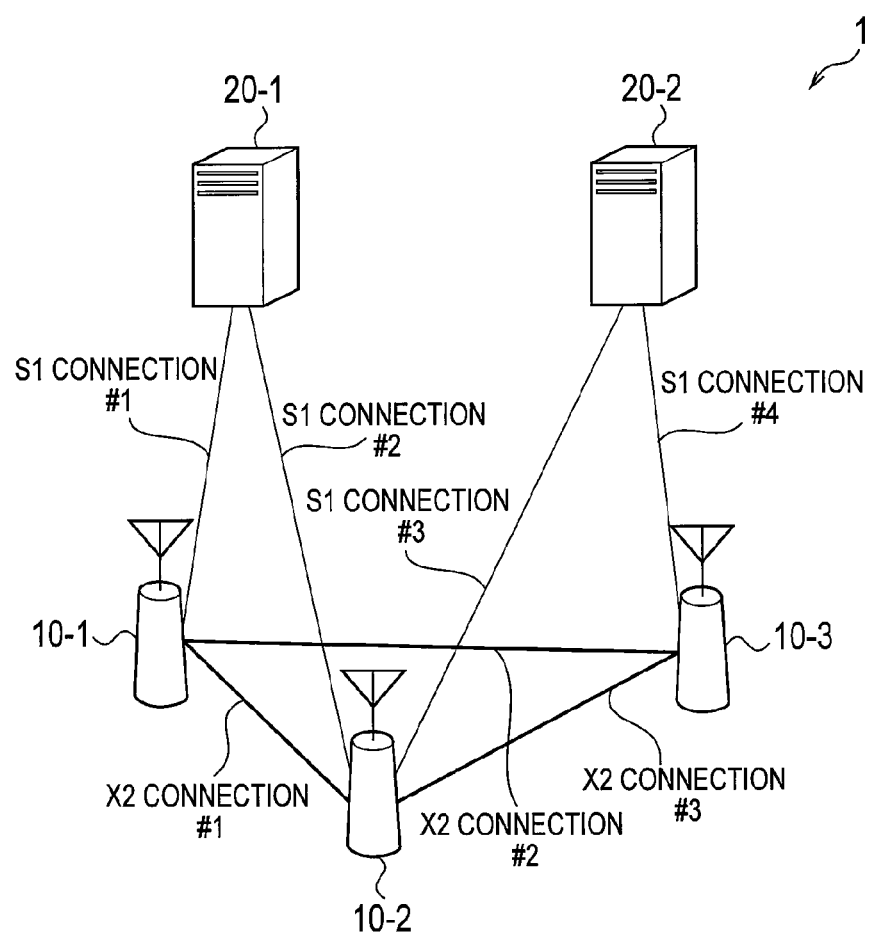
FIG. 8 is a view showing an established state of X2 connections in the radio communication system according to the embodiment of the present invention.

FIG. 8 is a view showing an established state of X2 connections in the radio communication system 1. Here we consider a case in which there are pieces of the handover history information respectively corresponding to the LTE base stations 10-1, 10-2, and 10-3, respective values of the connection time of the radio terminal 40 to the LTE base stations 10-1, 10-2, and 10-3 are equal to or above the threshold, and respective values of the radio field strength of the BCH signals from the LTE base stations 10-1, 10-2, and 10-3 are equal to or above the predetermined value in the radio terminal 40. In this case, as shown in FIG. 8, an X2 connection #1 is established between the LTE base station 10-1 and the LTE base station 10-2. Moreover, an X2 connection #2 is established between the LTE base station 10-1 and the LTE base station 10-3. In addition, an X2 connection #3 is established between the LTE base station 10-2 and the LTE base station 10-3.

After the X2 connections are established as described above, the handover destination determination unit 158 receives the first measurement report from the radio terminal 40 and further receives the second measurement report therefrom via the antenna 108 and the radio communication unit 106. The specific reception processing is similar to the reception processing by the connection establishment counterpart determination unit 154. Further, the handover destination determination unit 158 stores the measurement report formed of the first measurement report and the second measurement report in the storage unit 103.

Thereafter, the handover destination determination unit 158 receives the Global-CID of the other LTE base station from the radio terminal 40 via the antenna 108 and the radio communication unit 106.

Next, the handover destination determination unit 158 judges whether or not the radio field strength corresponding to the LTE base station 10-1 contained in the first measurement report, or in other words, the radio field strength at the radio terminal 40 of the BCH signal transmitted from the LTE base station 10-1 is below a first threshold. Moreover, the handover destination determination unit 158 judges whether or not the radio field strength corresponding to any of the LTE base stations (the other LTE base stations) different from the LTE base station 10-1 contained in the first measurement report is equal to or above a second threshold. Here, the second threshold is a value equal to or greater than the first threshold. The first threshold and the second threshold are respectively stored in the storage unit 103.

When the radio field strength corresponding to the LTE base station 10-1 is below the first threshold and the radio field strength corresponding to the other LTE base station is equal to or above the second threshold, the handover destination determination unit 158 judges that it is time for the radio terminal 40 to perform a handover from the LTE base station 10-1 to the other LTE base station.

When it is time for the radio terminal 40 to perform the handover, the handover destination determination unit 158 determines the other LTE base stations having the corresponding radio field strength equal to or above the second threshold as handover destination candidates.

Further, the handover destination determination unit 158 judges whether or not there is at least one other LTE base station among the other LTE base stations being the handover destination candidates, having the X2 connection established with the LTE base station 10-1. Specifically, the handover destination determination unit 158 judges whether or not the X2 connection establishment information associated with the Global-CID of the other LTE base stations, which are the handover destination candidates, is defined as "established" in the neighbor list. Then, when the X2 connection information is defined as "established", the handover destination determination unit 158 determines that the X2 connections have been established between the other LTE base stations of the handover destination candidates specified by the Global-CID associated with the X2 connection establishment information and the LTE base station 10-1.

When there is at least one other LTE base station among the other LTE base stations being the handover destination candidates, having the X2 connection established with the LTE base station 10-1, the handover destination determination unit 158 determines any of the other LTE base stations which establish the X2 connections with the LTE base station 10-1 as the handover destination. For example, the handover destination determination unit 158 determines the other LTE base station corresponding to the highest radio field strength among the other LTE base stations having the X2 connections established with the LTE base station 10-1 on the basis of the neighbor list as the handover destination.

On the other hand, when there is no other LTE base station among the other LTE base stations being the handover candidates having the X2 connection established with the LTE base station 10-1, the handover destination determination unit 158 determines one of the other LTE base stations being the handover destination candidates, or in other words, one of the other LTE base stations not having the X2 connection established with the LTE base station 10-1, as the handover destination. For example, the handover destination determination unit 158 determines the other LTE base station corresponding to the highest radio field strength on the basis of the neighbor list as the handover destination.

When the other LTE base station having the X2 connection established with the LTE base station 10-1 is determined as the handover destination, the handover processing unit 160 performs the X2 handover for the radio terminal 40 while setting the LTE base station 10-1 as the handover source.

On the other hand, when the other LTE base station which does not establish the X2 connection with the LTE base station 10-1 is determined as the handover destination, the handover processing unit 160 performs the S1 handover for the radio terminal 40 while setting the LTE base station 10-1 as the handover source.

(3) Operations of LTE Base Station

Next, operations of the LTE base station 10-1 will be described. Note that the LTE base stations 10-2 and 10-3 also perform operations similar to those of the LTE base station 10-1. In the following, the upper limit number of selected pieces of the handover history information is set to 2, and the other LTE base stations are referred to as a first most recent base station and a second most recent base station in reverse chronological order of time points of handovers for the radio terminal 40.

Figure 9:
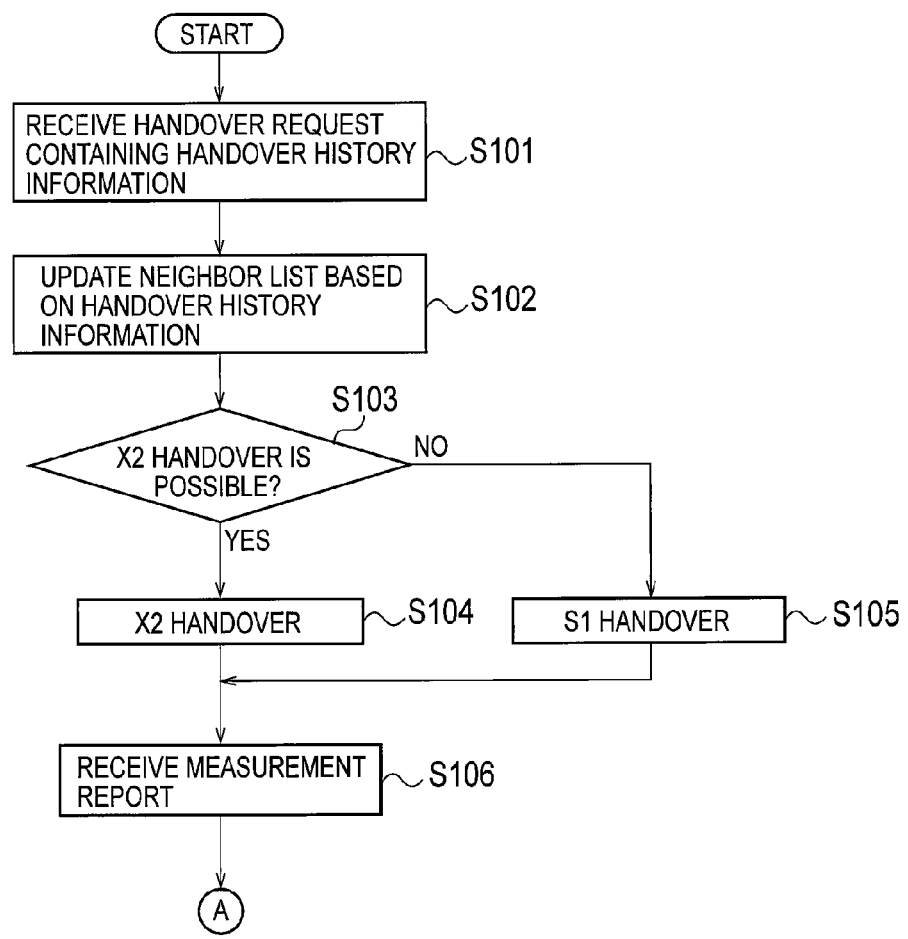
FIG. 9 is a first flowchart showing a first operation of the LTE base station according to the embodiment of the present invention.
Figure 10:
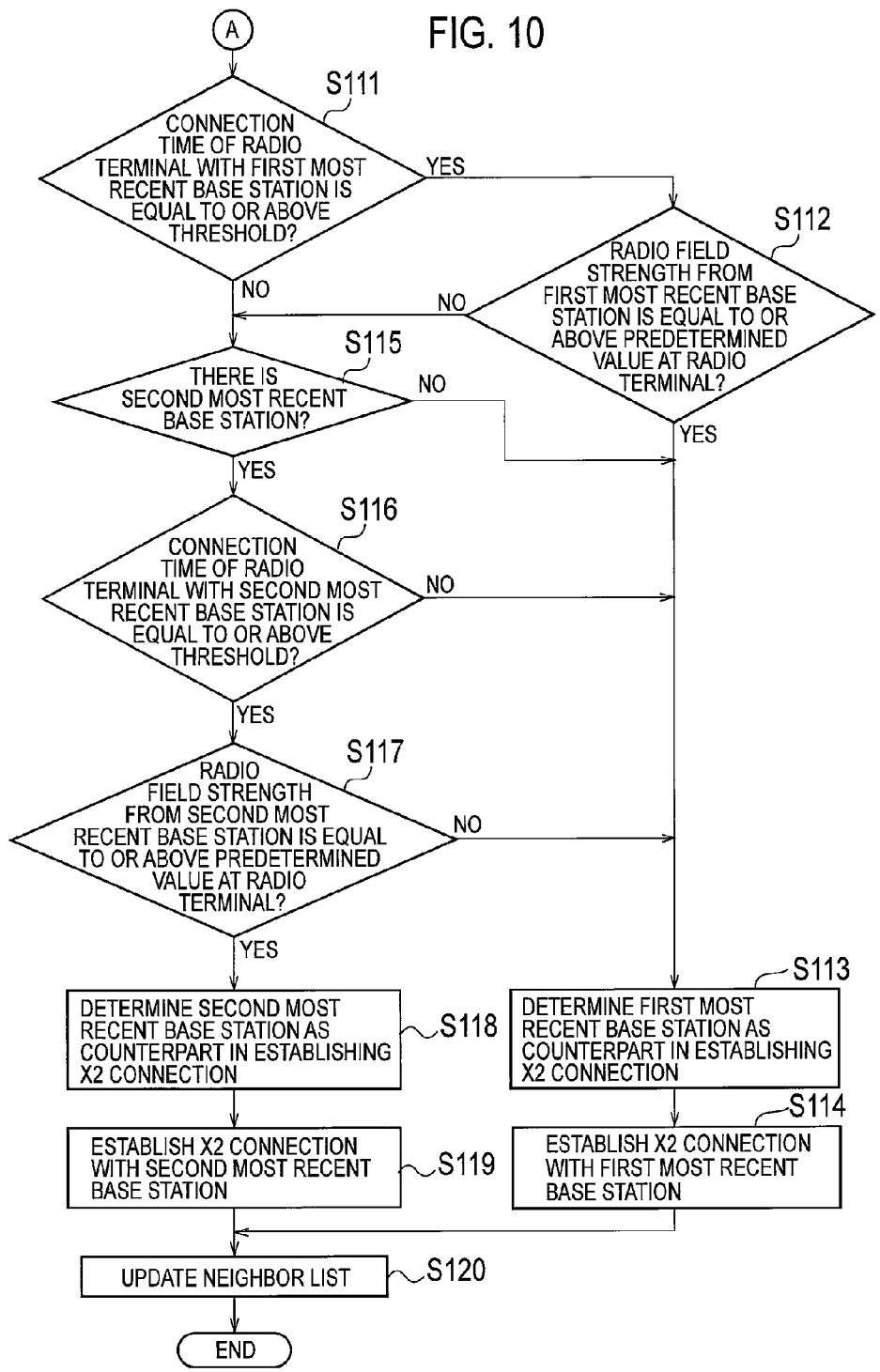
FIG. 10 is a second flowchart showing a second operation of the LTE base station according to the embodiment of the present invention.

FIG. 9 is a flowchart showing a first operation of the LTE base station 10-1. FIG. 10 is a flowchart showing a second operation of the LTE base station 10-1. FIG. 10 is a flowchart showing a third operation of the LTE base station 10-1.

In step S101 of FIG. 9, the LTE base station 10-1 receives the handover request containing the handover history information from the other LTE base station.

In step S102, the LTE base station 10-1 updates the neighbor list based on the handover history information. By this update, the neighbor list is generated for the other LTE base station corresponding to the handover history information.

In step S103, the LTE base station 10-1 judges whether or not the X2 handover is possible between the LTE base station 10-1 and the other LTE base station which is the sender of the handover request.

When the X2 handover is possible, the LTE base station 10-1 performs the X2 handover in step S104 with the other LTE base station which is the sender of the handover request. On the other hand, when the X2 handover is not possible, the LTE base station 10-1 performs the S1 handover in step S105 with the other LTE base station which is the sender of the handover request.

After the X2 handover in step S104 or after the S1 handover in step S105, the LTE base station 10-1 receives the measurement report from the radio terminal 40 connected to the LTE base station 10-1 by way of the handover in step S106.

Then the operation shown in FIG. 10 takes over. In step S111, the LTE base station 10-1 judges whether or not the connection time of the radio terminal 40 to the first most recent base station being the other LTE base station is equal to or above the threshold based on the handover history information.

When the connection time of the radio terminal 40 to the first most recent base station being the other LTE base station is equal to or above the threshold, in step S112, the LTE base station 10-1 judges whether or not the radio field strength from the first most recent base station is equal to or above the predetermined value at the radio terminal 40 based on the measurement report.

When the radio field strength from the first most recent base station is equal to or above the predetermined value at the radio terminal 40, the LTE base station 10-1 determines the first most recent base station as the counterpart in establishing the X2 connection in step S113. Further, the LTE base station 10-1 establishes the X2 connection with the first most recent base station in step S114.

On the other hand, when the connection time of the radio terminal 40 to the first most recent base station being the other LTE base station is judged to be below the threshold in step S111 or when the radio field strength from the first most recent base station is judged to be below the predetermined value at the radio terminal 40 in step S112, the LTE base station 10-1 judges whether or not there is the second most recent base station in step S115. Here, the LTE base station 10-1 judges that there is the second most recent base station when two or more pieces of the handover history information are received in step S101 of FIG. 9.

When there is not the second most recent radio base station, the LTE base station 10-1 determines the first most recent base station as the counterpart in establishing the X2 connection in step S113. Further, the LTE base station 10-1 establishes the X2 connection with the first most recent base station in step S114.

On the other hand, when there is the second most recent radio base station, the LTE base station 10-1 judges whether or not the connection time of the radio terminal 40 to the second most recent base station being the other LTE base station is equal to or above the threshold based on the handover history information in step S116.

When the connection time of the radio terminal 40 to the second most recent base station being the other LTE base station is below the threshold, the LTE base station 10-1 determines the first most recent base station as the counterpart in establishing the X2 connection in step S113. Further, the LTE base station 10-1 establishes the X2 connection with the first most recent base station in step S114.

On the other hand, when the connection time of the radio terminal 40 to the second most recent base station being the other LTE base station is equal to or above the threshold, in step S117, the LTE base station 10-1 judges whether or not the radio field strength from the second most recent base station is equal to or above the predetermined value at the radio terminal 40 based on the measurement report.

When the radio field strength from the second most recent base station being the other LTE base station is below the predetermined value at the radio terminal 40, the LTE base station 10-1 determines the first most recent base station as the counterpart in establishing the X2 connection in step S113. Further, the LTE base station 10-1 establishes the X2 connection with the first most recent base station in step S114.

On the other hand, when the connection time of the radio terminal 40 to the first most recent base station being the other LTE base station is equal to or above the threshold, the LTE base station 10-1 determines the second most recent base station as the counterpart in establishing the X2 connection in step S118. Further, the LTE base station 10-1 establishes the X2 connection with the second most recent base station in step S119.

After the X2 connection is established with the first most recent base station in step S114 or after the X2 connection is established with the second most recent base station in step S119, the LTE base station 10-1 updates the neighbor list corresponding to the other LTE base station being the counterpart in establishing the X2 connection in the neighbor list in step S120.

Thereafter, the handover is performed for the radio terminal 40 as described below while setting the LTE base station 10-1 as the handover source and setting the other LTE base station as the handover destination.

In step S201 of FIG. 11, the LTE base station 10-1 receives the measurement report from the radio terminal 40.

In step S202, the LTE base station 10-1 judges whether or not it is time for the radio terminal 40 to perform the handover from the LTE base station 10-1 to the other LTE base station.

When it is not a time to perform handover, the operations in step S201 of receiving the measurement report and the following steps will be repeated.

On the other hand, when it is time to perform the handover, the LTE base station 10-1 specifies the other LTE base stations being the handover destination candidates in step S203.

In step S204, the LTE base station 10-1 judges whether or not there is at least one other LTE base station having the X2 connection established with the LTE base station 10-1 among the other LTE base stations being the handover destination candidates.

When there is at least one other LTE base station having the X2 connection established with the LTE base station 10-1 among the other LTE base stations being the handover destination candidates, the LTE base station 10-1 determines one of the other LTE base stations having the X2 connection established with the LTE base station 10-1 as the handover destination in step S205. Further, in step S206, the LTE base station 10-1 performs the X2 handover with the other LTE base station determined as the handover destination.

On the other hand, when there is no other LTE base station among the other LTE base stations being the handover candidates having the X2 connection established with the LTE base station 10-1, the LTE base station 10-1 determines one of the other LTE base stations not having the X2 connection established with the LTE base station 10-1 as the handover destination in step S207. Further, in step S208, the LTE base station 10-1 performs the S1 handover with the other LTE base station determined as the handover destination.

(4) Operation and Effects

As described above, according to the radio communication system 1 of the embodiment of the present invention, the LTE base station 10-1 acquires the handover history information which indicates the handover history of the radio terminal 40. Further, the LTE base station 10-1 determines the other LTE base station qualifying for the counterpart in establishing the X2 connection based on the acquired handover history information.

When the other LTE base station having served as the handover destination for the radio terminal 40 in the past is compared with the other LTE base station not having served as the handover destination for the radio terminal 40 in the past, it is more likely that the radio terminal 40 connected to the other LTE base station having served as the handover destination for the radio terminal 40 in the past will perform the handover from the other LTE base station to the LTE base station 10-1. Accordingly, it is possible for the LTE base station 10-1 to establish the X2 connection in consideration of the past records of the handovers by determining the other LTE base station as the counterpart in establishing the X2 connection on the basis of the handover history of the radio terminal 40. In addition, it is possible to establish the appropriate X2 connection while restricting establishment of wasteful connections with the other LTE base stations that are less likely to serve as the handover destinations.

Meanwhile, the LTE base station 10-1 determines the other LTE base station having the connection time with the radio terminal 40 in the past equal to or above the threshold based on the handover history information as the counterpart in establishing the X2 connection.

The LTE base station having the long connection time with the radio terminal 40 in the past has presumably performed stable communication connection with the radio terminal 40. For this reason, even when the radio terminal 40 performs the handover from the LTE base station 10-1 to the other LTE base station, it is likely that the radio terminal 40 will be able to perform stable communication connection with the other LTE base station. Therefore, by allowing the LTE base station 10-1 to determine the other LTE base station having the connection time with the radio terminal 40 in the past equal to or above the threshold as the counterpart in establishing the X2 connection, it is possible to establish the appropriate X2 connection while restricting establishment of wasteful connections with the other LTE base stations that are less likely to serve as the handover destinations.

Meanwhile, the LTE base station 10-1 performs the following: selecting the pieces of the handover history information in reverse chronological order of the time points of the relevant handovers; judging whether or not the connection time of the radio terminal 40 to the other LTE base station corresponding to the selected piece of the handover history information is equal to or above the threshold; judging whether or not the radio field strength of the BCH signal from the other LTE base station corresponding to the selected piece of the handover history information is equal to or above the predetermined value; and executing the process to determine the counterpart in establishing the X2 connection. However, the LTE base station 10-1 does not further select the pieces of the handover history information when the number of selected pieces of the handover history information reaches the predetermined upper limit.

In this way, only a predetermined number of the other LTE base stations having the recent time points of the handovers for the radio terminal 40 are eligible for the counterpart in establishing the X2 connection. The other LTE base station with an older time point of the relevant handover is less likely to serve as the handover destination for the radio terminal 40. Accordingly, when the LTE base station 10-1 selects only the predetermined number of the other LTE base stations having the recent time points of the relevant handovers as eligible for the counterpart in establishing the X2 connection, it is possible to establish the appropriate X2 connection while restricting establishment of wasteful X2 connections with the other LTE base stations that are less likely to serve as the handover destinations.

In the meantime, when the radio terminal 40 measures the radio field strength of the BCH signal from the other LTE base station, the LTE base station 10-1 selects only the other LTE base stations having the values of the radio field strength equal to or above the predetermined value as eligible for the counterpart in establishing the X2 connection.

The other LTE base station with low radio field strength at the radio terminal 40 is less likely to serve as the handover destination. Accordingly, when the LTE base station 10-1 selects only the other LTE base stations having the values of the radio field strength equal to or above the predetermined value at the radio terminal 40 as eligible for the counterpart in establishing the X2 connection, it is possible to establish the appropriate X2 connection while restricting establishment of wasteful connections with the other LTE base stations that are less likely to serve as the handover destinations.

Moreover, according to the radio communication system 1 of the embodiment of the present invention, when there is at least one other LTE base station among the other LTE base stations determined as the handover destination candidates having the X2 connection established with the LTE base station 10-1, the LTE base station 10-1 determines the other LTE base station having the X2 connection established with the LTE base station 10-1 as the handover destination. On the other hand, when there is no other LTE base station having the X2 connection established with the LTE base station 10-1, the LTE base station 10-1 determines the other LTE base station which does not establish the X2 connection with the LTE base station 10-1 as the handover destination.

In this way, the LTE base station 10-1 determines the other LTE base station having the X2 connection established with the LTE base station 10-1 preferentially as the handover destination. Accordingly, the other LTE base station having the X2 connection established with the LTE base station 10-1 is more likely to serve as the handover destination as compared to the other LTE stations not having the X2 connection established therewith. In other words, the scope of the other LTE base stations qualifying for the handover destination is limited as compared to the case of determining the handover destination in consideration of the established state of the X2 connections at all. Therefore, in an environment where the LTE base stations are densely installed, it is possible to prevent a problem that presence of numerous handover destination candidates eventually leads to frequent occurrence of handovers and to an increase in the load on the entire radio communication system 1.

(5) Other Embodiments

As described above, the present invention has been described by using the embodiment. However, it should not be understood that the description and drawings which constitute part of this disclosure limit the present invention. From this disclosure, various alternative embodiments, examples, and operation techniques will be easily found by those skilled in the art.

In the above-described embodiment, the LTE base station 10-1 determines the other LTE base station being the counterpart in establishing the X2 connection based on both of the handover history information and the measurement report. However, on the basis of only the handover history information, the LTE base station 10-1 may determine the other LTE base stations having values of the connection time in the corresponding handover history information equal to or above the threshold among the other LTE base stations, as the counterparts in establishing the X2 connection; and thereafter, on the basis of the measurement report, the LTE base station 10-1 may limit the counterpart in establishing the X2 connection to the other LTE base station that has the radio field strength at the radio terminal 40 equal to or above the predetermined value.

In addition, in the above-described embodiment, the LTE base station 10-1 of the handover source detects that the time comes for the radio terminal 40 to perform the handover and transmits the SCTP connection request being the request for establishing the X2 connection to the other LTE base station of the handover destination. However, the other LTE base station of the handover destination may detect that the time comes for the radio terminal 40 to perform the handover and transmit the SCTP connection request being the request for establishing the X2 connection to the LTE base station 10-1 of the handover source.

Moreover, the measurement report may contain information concerning communication quality such as a condition of a load on the CPU of the other LTE base station or a condition of a load on the radio channel in addition to the Phy-CID and the radio field strength. In this case, the LTE base station 10-1 can determine the LTE base station as the handover destination in consideration of not only the radio field strength but also the condition of the load on the CPU of the other LTE base station, the condition of the load on the radio channel, and so forth.

Further, the established X2 connection may be released later. In this case, upon receipt of a SCTP release request which is a request from the other LTE base station for releasing the X2 connection, the connection establishment processing unit 156 in the control unit 102 of the LTE base station 10-1 releases the X2 connection established with the other LTE base station being the sender. Moreover, the connection establishment processing unit 156 changes the X2 connection establishment information associated with the Global-CID of the other LTE base station being the sender of the SCTP release request from "established" into "unestablished" in the neighbor list stored in the storage unit 103.

Alternatively, the connection establishment processing unit 156 in the control unit 102 of the LTE base station 10-1 measures time elapsed since each established X2 connection starts to be used in the X2 handover. Further, the connection establishment processing unit 156 releases the relevant X2 connection when the elapsed time thus measured becomes equal to or above a predetermined time period. Moreover, the connection establishment processing unit 156 changes the X2 connection establishment information associated with the Global-CID of the other LTE base station being the sender of the SCTP release request from "established" into "unestablished" in the neighbor list stored in the storage unit 103.

Additionally, the neighbor list may contain a condition of a load on the processing by the corresponding other LTE base station and a condition of a load on the network. In this case, it is possible to perform communication control while taking into account various load conditions in the radio communication system 1.

Moreover, although the aforementioned embodiment has described the radio communication system 1 according to the LTE, the present invention is similarly applicable to any radio communication system configured to establish a logical transmission path between radio base stations.

As described above, it should be understood that the present invention includes various embodiments which are not described herein. Accordingly, the technical scope of the present invention should be determined only by the matters to define the invention in the scope of claims regarded as appropriate from this disclosure.

Note that the entire content of Japanese Patent Application No. 2009-293511 (filed on Dec. 24, 2009) is incorporated herein by reference.

Industrial Applicability

A radio base station and a connection establishment control method of the present invention are capable of establishing an appropriate connection with another radio base station and are therefore useful as a radio base station and a connection establishment control method.

The invention claimed is:

1. A radio base station configured to establish a connection being a logical transmission path with any of other radio base stations, comprising:
   a history acquisition unit configured to receive a handover request to perform a handover for a radio terminal from another radio base station as a handover source, the handover request including handover history information indicating handover history of the radio terminal; and
   an establishment counterpart determination unit configured to determine one of the other radio base stations as a counterpart in establishing the connection based on the handover history information acquired by the history acquisition unit, wherein
   the handover history information comprises connection time of the radio terminal with the other radio base stations of past handover destinations, and
   the establishment counterpart determination unit determines the other radio base station corresponding to the connection time equal to or above a predetermined threshold as the counterpart in establishing the connection.

2. The radio base station according to claim 1, wherein the establishment counterpart determination unit determines the counterpart in establishing the connection from a predetermined number of most recent other base stations having served as handover destinations among the radio base stations of the past handover destinations for the radio terminal.

3. The radio base station according to claim 1, wherein the establishment counterpart determination unit acquires communication quality between the radio terminal and the other radio base stations and determines one of the other radio base stations as the counterpart in establishing the connection based on the communication quality.

4. The radio base station according to claim 1, comprising:
   a handover destination determination unit configured to determine the other radio base station having the connection established with the radio base station, as a handover destination for the radio terminal in preference to the other radio base stations not having the connection established with the radio base station.

5. A connection establishment control method for a radio base station configured to establish a connection being a logical transmission path with any of other radio base stations, comprising:
   causing the radio base station to receive a handover request to perform a handover for a radio terminal from another radio base station as a handover source, the handover request including handover history information indicating handover history of the radio terminal and comprising connection time of the radio terminal with other radio base stations of past handover destinations; and
   causing the radio base station to determine one of the other radio base stations corresponding to the connection time equal to or above a predetermined threshold as a counterpart in establishing the connection.

\* \* \* \* \*